US012739180B2

(12) United States Patent
Zhang et al.

(10) Patent No.: US 12,739,180 B2
(45) Date of Patent: Sep. 15, 2026

(54) METHOD FOR REPORTING QOE MEASUREMENT REPORTS, AND DEVICE, APPARATUS AND STORAGE MEDIUM

(71) Applicant: DATANG MOBILE COMMUNICATIONS EQUIPMENT CO., LTD., Beijing (CN)

(72) Inventors: Mingzhu Zhang, Beijing (CN); Chunlin Ni, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 357 days.

(21) Appl. No.: 18/557,586

(22) PCT Filed: Apr. 29, 2022

(86) PCT No.: PCT/CN2022/090667
§ 371 (c)(1),
(2) Date: Oct. 26, 2023

(87) PCT Pub. No.: WO2022/237601
PCT Pub. Date: Nov. 17, 2022

(65) Prior Publication Data
US 2024/0223474 A1 Jul. 4, 2024

(30) Foreign Application Priority Data
May 8, 2021 (CN) ......................... 202110501120.X

(51) Int. Cl.
*H04W 24/10* (2009.01)
*H04L 41/5067* (2022.01)

(52) U.S. Cl.
CPC ......... *H04L 41/5067* (2013.01); *H04W 24/10* (2013.01)

(58) Field of Classification Search
CPC ........................... H04L 41/5067; H04W 24/10
See application file for complete search history.

(56) References Cited

U.S. PATENT DOCUMENTS 12,375,370 B2 * 7/2025 Eklöf ................. H04L 41/0806
2013/0237157 A1 9/2013 Phan et al.
2014/0129289 A1 * 5/2014 Phan ................. G06Q 30/0201 705/7.29
2020/0153712 A1 * 5/2020 Miao ..................... H04W 72/12
(Continued)

FOREIGN PATENT DOCUMENTS

CN 104796443 A 7/2015
CN 107534887 A 1/2018
(Continued)

OTHER PUBLICATIONS

European Patent Office, Extended European Search Report Issued in Application No. 22806569.4, Sep. 30, 2024, Germany, 14 pages.
(Continued)

*Primary Examiner* — Fahmida S Chowdhury
(74) *Attorney, Agent, or Firm* — KILPATRICK TOWNSEND & STOCKTON LLP

(57) ABSTRACT

Provided in the embodiments of the present disclosure are a method for reporting QoE measurement reports, and a device, an apparatus and a storage medium. The method is applied to a user terminal, and includes receiving a reporting suspension message, which is sent by a network side device, regarding QoE measurement reports, and the reporting suspension message is used for instructing the user terminal to suspend the reporting of QoE measurement reports on the basis of first instruction information sent by the network side device; and according to the reporting suspension message, suspending the reporting of the QoE measurement reports corresponding to the first instruction information. By means of the method for reporting QoE measurement reports, and the device, the apparatus and the storage medium provided in the embodiments of the present disclosure.

12 Claims, 2 Drawing Sheets

Receiving a pause reporting message for the QoE measurement reports transmitted from a network side device, where the pause reporting message is used to indicate the user terminal to pause reporting for the QoE measurement reports based on first indication information transmitted from the network side device — 100

↓

Pausing reporting for the QoE measurement reports corresponding to the first indication information based on the pause reporting message — 101

(56) References Cited

U.S. PATENT DOCUMENTS

| | | | | |
|---|---|---|---|---|
| 2020/0413301 | A1 | 12/2020 | Shi et al. | |
| 2021/0385691 | A1* | 12/2021 | Johansson | H04W 24/00 |
| 2022/0279385 | A1* | 9/2022 | Johansson | H04W 24/04 |
| 2023/0035066 | A1* | 2/2023 | Bae | H04L 1/00 |
| 2023/0116324 | A1* | 4/2023 | Eklöf | H04W 24/10<br>370/331 |
| 2023/0231779 | A1* | 7/2023 | Centonza | H04L 41/5067<br>370/252 |
| 2023/0308919 | A1* | 9/2023 | Barac | H04L 65/80 |
| 2023/0319616 | A1* | 10/2023 | Lunardi | H04W 28/0284<br>370/329 |
| 2024/0064550 | A1* | 2/2024 | Liu | H04L 41/5067 |
| 2024/0172027 | A1* | 5/2024 | Liu | H04W 24/10 |
| 2024/0187897 | A1* | 6/2024 | He | H04W 24/10 |
| 2024/0188175 | A1* | 6/2024 | Liu | H04W 76/27 |
| 2024/0223474 | A1* | 7/2024 | Zhang | H04W 28/0967 |
| 2024/0314662 | A1* | 9/2024 | Krishnan | H04W 36/304 |

FOREIGN PATENT DOCUMENTS

| | | | |
|---|---|---|---|
| CN | 112351442 | A | 2/2021 |
| WO | 2018150249 | A1 | 8/2018 |
| WO | 2019073340 | A1 | 4/2019 |
| WO | 2019106055 | A1 | 6/2019 |
| WO | 2020128657 | A1 | 6/2020 |
| WO | 2021028397 | A1 | 2/2021 |
| WO | 2021098074 | A1 | 5/2021 |

OTHER PUBLICATIONS

State Intellectual Property Office of the People's Republic of China, Office Action and Search Report Issued in Application No. 202110501120.X, Aug. 31, 2024, 10 pages.

Qualcomm Inc., "QoE report suspending in RAN overload and RRC_Idle/Inactive", 3GPP TSG-RAN WG3 Meeting #111e, E-Meeting: Jan. 25-Feb. 4, 2021, total 5 pages, R3-210355.

3GPP TR 38.890 V17.0.0, 3rd Generation Partnership Project; Technical Specification Group Radio Access Network; Study on NR QoE (Quality of Experience) management and optimizations for diverse services (Release 17), Apr. 2021.

ISA State Intellectual Property Office of the People's Republic of China, International Search Report Issued in Application No. PCT/CN2022/090667, Jun. 29, 2022, WIPO, 4 pages.

* cited by examiner

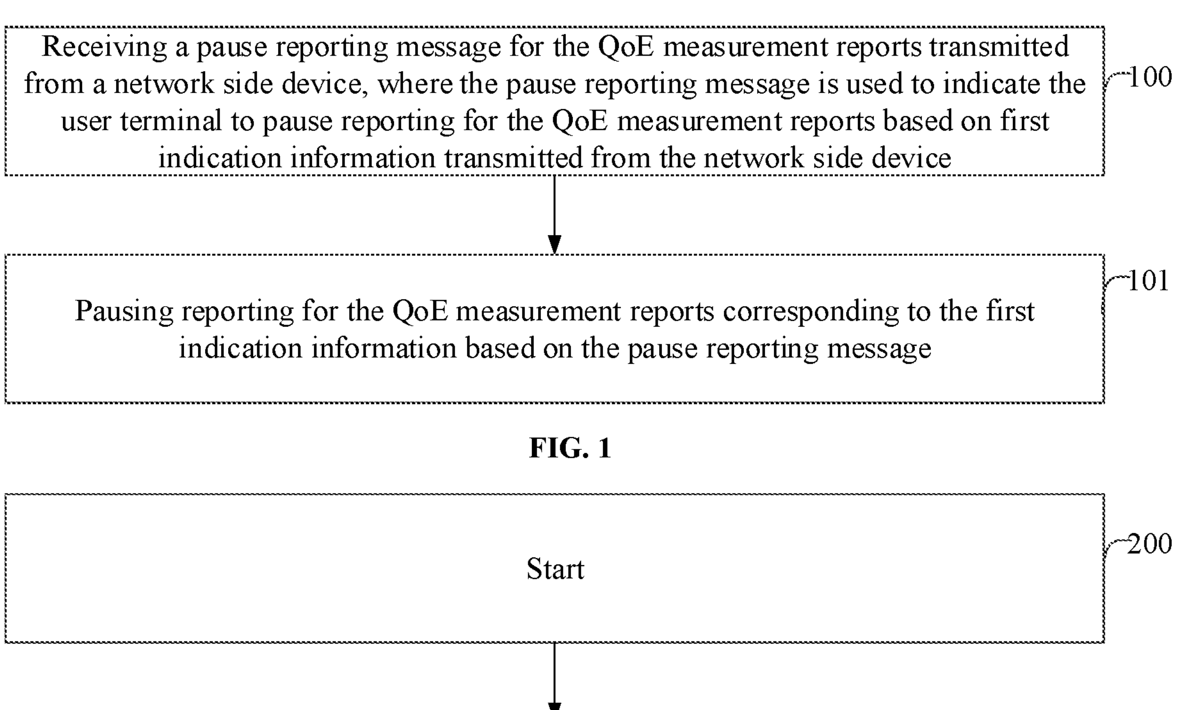
FIG. 1
FIG. 2
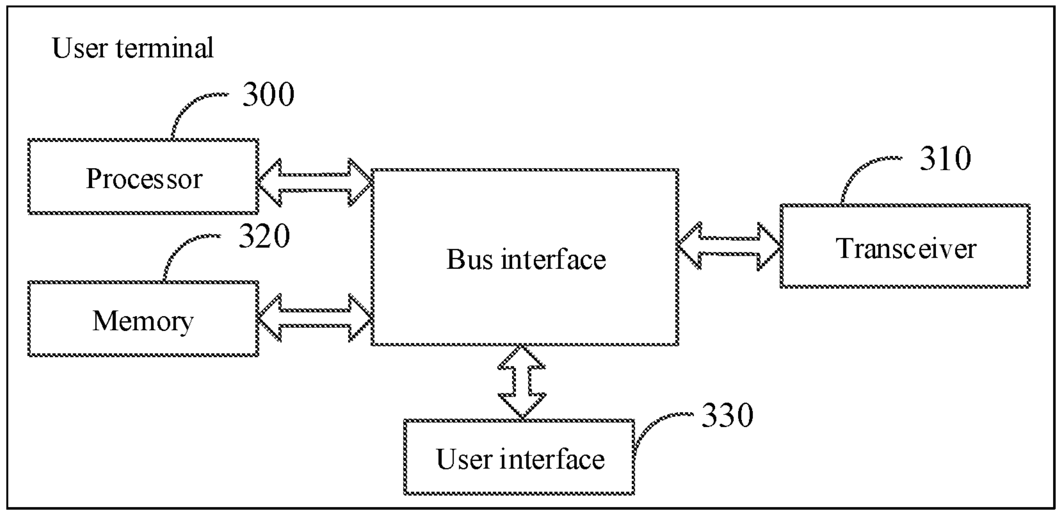
FIG. 3

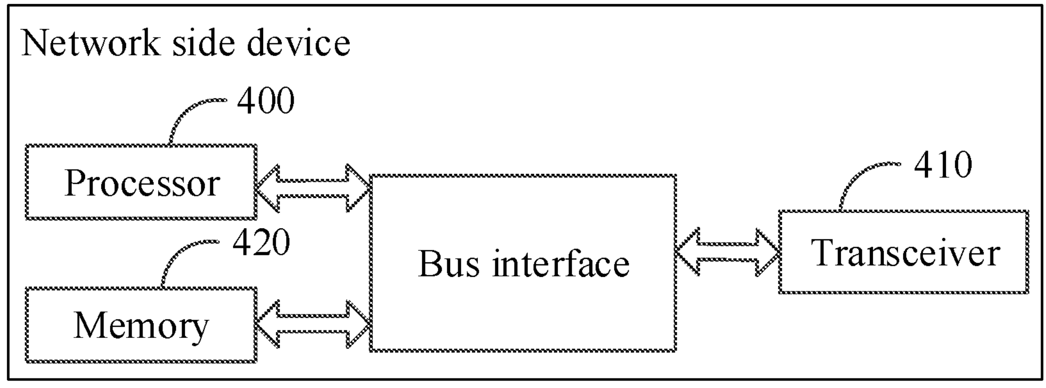
FIG. 4
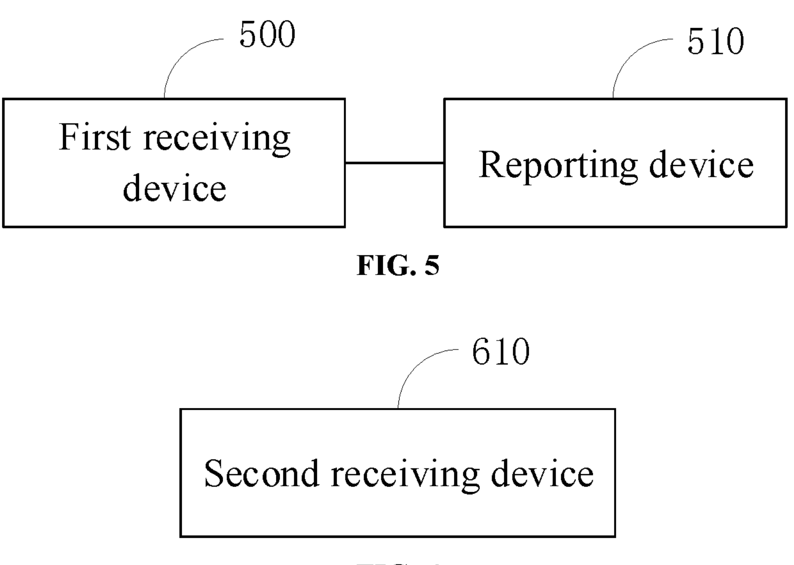
FIG. 5
FIG. 6

METHOD FOR REPORTING QOE MEASUREMENT REPORTS, AND DEVICE, APPARATUS AND STORAGE MEDIUM

CROSS-REFERENCE TO RELATED APPLICATION

The present application is a National Stage of International Application No. PCT/CN2022/090667, filed on Apr. 29, 2022, which claims priority to Chinese application No. 202110501120.X filed on May 8, 2021, entitled "Method for Reporting QoE Measurement Reports, and Device, Apparatus and Storage Medium", which are hereby incorporated by reference in their entireties.

FIELD

The present application relates to the field of communication, and in particular, to methods and apparatuses for reporting quality of experience (QoE) measurement reports, devices and a storage medium.

BACKGROUND

In a universal mobile telecommunications system (UMTS) terrestrial radio access network (UTRAN) and an evolved UMTS terrestrial radio access network (E-UTRAN), quality of experience (QoE) measurement collection is specified for streaming services. For new radio (NR) QoE measurements, not only the experience parameters of streaming media services need to be collected, typical performance requirements of different services (such as augmented reality (AR)/virtual reality (VR) and ultra reliable low latency communication (URLLC)) are also considered.

The NR QoE measurements aim to collect experience parameters of different service types. When a core network (CN) or an operation, management and maintenance (OAM) transmits QoE configuration to a network side device, the network side device will forward the QoE configuration to a user equipment (UE), the UE collects relevant QoE measurements and reports QoE measurement reports to the network side device, and the network side device forwards the QoE measurement reports to the core network or OAM. The QoE measurement reports are generally very large. In case that burdens of the network side device are heavy, or the UE is handed over or reconnected to a network side device that does not support the QoE function, the traditional reporting mechanism of the QoE measurement reports will further increase burdens of the network side device or may fail to ensure the validity of the QoE measurement reports.

SUMMARY

Embodiments of the present application provide methods and apparatuses for reporting quality of experience (QoE) measurement reports, devices and a storage medium.

An embodiment of the present application provides a method for reporting quality of experience (QoE) measurement reports, applied to a user terminal, including:

receiving a pause reporting message for the QoE measurement reports transmitted from a network side device, where the pause reporting message is used to indicate the user terminal to pause reporting for the QoE measurement reports based on first indication information transmitted from the network side device; and pausing reporting for the QoE measurement reports corresponding to the first indication information based on the pause reporting message.

In an embodiment, the first indication information is one or more of a QoE measurement identifier (ID), a priority for a service type, a priority for a QoE measurement ID, a service type and a QoE configuration type:

the pausing the reporting for the QoE measurement reports corresponding to the first indication information, includes:

determining the QoE measurement reports corresponding to the first indication information based on received first indication information; and pausing reporting for determined QoE measurement reports.

In an embodiment, the first indication information is a first indication ID used for indicating pausing reporting for all QoE measurement reports:

the pausing the reporting for the QoE measurement reports corresponding to the first indication information, includes:

pausing reporting for all QoE measurement reports based on received first indication ID.

In an embodiment, before the receiving the pause reporting message for the QoE measurement reports transmitted from the network side device, the method further includes:

receiving a signaling message transmitted from the network side device, where the signaling message includes the first indication information.

In an embodiment, the method further includes:

transmitting a response message to the network side device, where the response message is used for notifying the network side device that it has determined to pause the reporting for the QoE measurement reports corresponding to the first indication information.

In an embodiment, the method further includes:

receiving a configuration message transmitted from the network side device, where the configuration message includes association information between a service type and a QoE measurement ID;

the pausing the reporting for the QoE measurement reports corresponding to the first indication information based on the pause reporting message, includes:

in case that the first indication information is the service type, determining QoE measurement reports corresponding to the service type and QoE measurement reports corresponding to the QoE measurement ID associated with the service type based on the received association information between the service type and the QoE measurement ID: and pausing reporting for determined QoE measurement reports to the network side device.

An embodiment of the present application further provides a method for reporting Quality of Experience (QoE) measurement reports, applied to a network side device, including:

transmitting a pause reporting message for the QoE measurement reports to a user terminal to indicate the user terminal to pause reporting for the QoE measurement reports based on first indication information transmitted from the network side device.

In an embodiment, the first indication information is one or more of a QoE measurement identifier (ID), a priority for a service type, a priority for a QoE measurement ID, a service type, a QoE configuration type and a first indication ID used for indicating pausing reporting for all QoE measurement reports.

In an embodiment, before the transmitting a pause reporting message for the QoE measurement reports to the user terminal, the method further includes:

transmitting a signaling message to the user terminal, where the signaling message includes the first indication information.

In an embodiment, the method further includes:

receiving a response message transmitted from the user terminal, where the response message is used for notifying the network side device that the user terminal has determined to pause the reporting for the QoE measurement reports corresponding to the first indication information.

In an embodiment, the method further includes:

transmitting a configuration message to the user terminal, where the configuration message includes association information between a service type and a QoE measurement ID.

An embodiment of the present application further provides a user terminal, including:

a memory;

a transceiver; and a processor, where the memory is used to store a computer program;

the transceiver is used to transmit and receive data under a control of the processor; and the processor is used to read the computer program in the memory and causes the user terminal to execute the method for reporting quality of experience (QoE) measurement reports according to the embodiments of the present application.

An embodiment of the present application further provides a network side device, including:

a memory;

a transceiver; and a processor, where the memory is used to store a computer program;

the transceiver is used to transmit and receive data under a control of the processor; and the processor is used to read the computer program in the memory and causes the network side device to execute the method for reporting quality of experience (QoE) measurement reports according to the embodiments of the present application.

An embodiment of the present application further provides an apparatus for reporting Quality of Experience (QoE) measurement reports, applied to a user terminal, including:

a first receiving device, used for receiving a pause reporting message for the QoE measurement reports transmitted from a network side device, where the pause reporting message is used to indicate the user terminal to pause reporting for the QoE measurement reports based on first indication information transmitted from the network side device: and a reporting device, used for pausing reporting for the QoE measurement reports corresponding to the first indication information based on the pause reporting message.

An embodiment of the present application provides an apparatus for reporting Quality of Experience (QoE) measurement reports, applied to a network side device, including:

a second transmitting device, used for transmitting a pause reporting message for the QoE measurement reports to a user terminal to indicate the user terminal to pause reporting for the QoE measurement reports based on first indication information transmitted from the network side device.

An embodiment of the present application further provides a processor-readable storage medium storing a computer program that causes, when executed by a processor, the processor to perform steps of the method for reporting QoE measurement reports applied to the user terminal and the method for reporting QoE measurement reports applied to the network side device.

In the methods and devices for reporting the QoE measurement reports, apparatuses and the storage medium provided in the embodiments of the present application, the user terminal can pause the reporting for some or all QoE measurement reports upon receiving the pause reporting message transmitted from the network side device, and the network side device can alleviate network burdens by controlling the reporting for the QoE measurement reports performed by the user terminal.

BRIEF DESCRIPTION OF THE DRAWINGS

In order to illustrate solutions in the embodiments of the present application or in the related art, the drawings used in the descriptions of the embodiments or the related art are briefly described below. The drawings in the following description are only some embodiments of the present application.

FIG. 1 is a first schematic flowchart of a method for reporting quality of experience (QoE) measurement reports according to an embodiment of the present application:

FIG. 2 is a second schematic flowchart of a method for reporting quality of experience (QoE) measurement reports according to an embodiment of the present application:

FIG. 3 is a schematic structural diagram of a user terminal according to an embodiment of the present application:

FIG. 4 is a schematic structural diagram of a network side device according to an embodiment of the present application.

FIG. 5 is a first schematic structural diagram of an apparatus for reporting QoE measurement reports according to an embodiment of the present application: and FIG. 6 is a second schematic structural diagram of an apparatus for reporting QoE measurement reports according to an embodiment of the present application.

DETAILED DESCRIPTION

In the embodiments of the present application, the term "and/or" describes a related relationship of associated objects, and indicates that there can be three kinds of relationships. For example, A and/or B can represent that A exists alone, A and B exist simultaneously, and B exists alone. Character "/" generally indicates that the associated objects have an "or" relationship.

In the embodiments of the present application, the term "multiple" refers to two or more, and other quantifiers are similar.

The solutions in the embodiments of the present application are clearly and completely described in the following with reference to the accompanying drawings in the embodiments of the present application. These embodiments are only a part of the embodiments of the present application, and not all of the embodiments.

The 3rd generation partnership project (3GPP) specification defines two quality of experience (QoE) configuration types, one type is signaling-based case, that is, a signaling-based QoE configuration type, and the process includes that an operation, management and maintenance (OAM) transmits QoE configuration to a core network (CN), the CN transmits the QoE configuration to a network side device, and the network side device forwards the QoE configuration to a user equipment (UE). The configuration in this case is for a specific UE. The other type is a management-based case, that is, a management-based QoE configuration type, the process includes that that the OAM directly transmits the QoE configuration to the network side device, and the network side device forwards the configuration to the UE. The configuration in this case is for a specific UE or multiple UEs.

The QoE measurement management parameters are specified in the R16 protocol version, and are shown in the following.

a. QoE Collection entity address

This is a parameter which defines an internet protocol (IP) address to which the QoE measurement collection (QMC) records shall be transferred. internet protocol version 4 (Ipv4) or internet protocol version 6 (Ipv6) addresses may be used.

b. QoE reference

This parameter defines a network request session. The QoE reference shall be globally unique, and it is composed as follows:

mobile country code (MCC)+mobile network code (MNC)+QMC identifier (ID), where the MCC and the MNC, together with a trace activation request, come from a management system, and are used for identifying a public land mobile network (PLMN) included in the management system, and the QMC ID is a 3-byte string.

c. PLMN target

This parameter defines the PLMN for which sessions shall be selected in the network request session in case of area based QMC when several PLMNs are supported in a radio access network (RAN). (This means that shared cells and unshared cells are allowed for the specified PLMN. Furthermore, several PLMNs can be used for unshared RAN cases as well as for shared RAN cases.) Only the sessions may be selected in case that the PLMN that the UE reports as selected PLMN is the same as the PLMN target. The PLMN target may differ from the PLMN specified in the network request session ID, as that specifies the PLMN containing the management system requesting the network request session from a network equipment (NE). The parameter is mandatory if network sharing is deployed.

d. area scope

This parameter defines a physical area or cells or tracking area or location area where the QoE measurements shall be performed. If the parameter does not exist, the QMC shall be performed throughout the PLMN specified in PLMN target.

e. QMC configuration file f. QMC target g. recording session ID

This parameter shall be the same for the whole session in an application layer, while for each different session in the application layer, the recording session ID shall be different.

After the core network or OAM transmits the QoE configuration to the network side device, the network side device will forward the QoE configuration to the UE, and the UE collects relevant QoE measurements and reports them to the network side device. Since the QoE measurement reports are generally very large, and in case that burdens of the network side device are heavy, or the UE is handed over or reconnected to a network side device that does not support the QoE function, the network side device needs to control the reporting for the QoE measurement reports from the UE to alleviate burdens or to ensure the validity of the QoE measurement reports. Therefore, various embodiments of the present application provide a solution, which can enable the network side device to control the reporting for the QoE measurement reports from the UE by configuring parameters associated with the QoE measurement configuration.

FIG. 1 is a schematic flowchart of a method for reporting quality of experience (QoE) measurement reports according to an embodiment of the present application. The method is applied to a user terminal, as referred to as a user equipment (UE). As shown in FIG. 1, the method includes the following steps.

Step 100: receiving a pause reporting message for the QoE measurement reports transmitted from a network side device, where the pause reporting message is used to indicate the user terminal to pause reporting for the QoE measurement reports based on first indication information transmitted from the network side device.

In order to collect experience parameters of different service types, the core network or OAM will first transmit the QoE configuration to the network side device (such as the base station next generation NodeB (gNB)). After receiving the QoE configuration, the network side device may transmit a QoE measurement configuration message to the user terminal. The QoE measurement configuration message carries information such as the QoE configuration and a service type. After receiving the QoE measurement configuration message, the user terminal may start to perform QoE measurement based on configuration information in the QoE measurement configuration message, store QoE measurement reports and report the stored QoE measurement reports to the network side device.

When the network side device determines that the user terminal needs to pause reporting for the QoE measurement reports, for example, when burdens of the network side device is heavy, or the user terminal is handed over or reconnected to a network side device that does not support the QoE services, in order to alleviate burdens of the network side device, or to prevent invalid reporting from occupying system resources, the network side device may transmit a pause reporting message for the QoE measurement reports to the user terminal to indicate the user terminal to pause the reporting for part or all of the QoE measurement reports. The user terminal may determine which QoE measurement report(s) to be paused from reporting based on the first indication information transmitted from the network side device.

In an embodiment, the pause reporting message for the above-mentioned QoE measurement reports may be various radio resource control (RRC) signaling or broadcast messages, which are not specifically limited here, for example, it may be RRC reconfiguration message.

Step 101: pausing reporting for the QoE measurement reports corresponding to the first indication information based on the pause reporting message.

After receiving the pause reporting message, the user terminal may pause the reporting for the QoE measurement reports corresponding to the first indication information based on the first indication information transmitted from the network side device, which alleviates burdens of the network side device.

In the method for reporting the QoE measurement reports provided by the embodiments of the present application, the user terminal can pause the reporting for some or all QoE measurement reports upon receiving the pause reporting message transmitted from the network side device, and the network side device can alleviate burdens by controlling the reporting for the QoE measurement reports performed by the user terminal.

In an embodiment, the first indication information is one or more of a QoE measurement ID, a priority for a service type, a priority for a QoE measurement ID, a service type and a QoE configuration type:

the pausing the reporting for the QoE measurement reports corresponding to the first indication information, includes:

determining the QoE measurement reports corresponding to the first indication information based on received first indication information; and pausing reporting for determined QoE measurement reports.

After receiving the pause reporting message, the user terminal may pause the reporting for the QoE measurement reports corresponding to the first indication information based on the first indication information transmitted from the network side device. The first indication information may be one or more of a QoE measurement ID, a priority for a service type, a priority for a QoE measurement ID, a service type and a QoE configuration type.

The first indication information may be the QoE measurement ID. That is, the network side device specifies, in the first indication information transmitted to the user terminal, which reporting for the QoE measurement reports corresponding to which QoE measurement ID(s) to be paused. After receiving the pause reporting message, the user terminal can determine the QoE measurement reports corresponding to QoE measurement ID specified in the first indication information based on the specified QoE measurement ID and pause the reporting for the determined QoE measurement reports. There may be one or more specified QoE measurement IDs.

The first indication information may be the priority for the service type. That is, the network side device specifies, in the first indication information transmitted to the user terminal, which reporting for the QoE measurement reports corresponding to which priority(ies) for the service type to be paused. After receiving the pause reporting message, the user terminal can determine the QoE measurement reports corresponding to service type priority specified in the first indication information based on the specified service type priority and pause the reporting for the determined QoE measurement reports. Each service type priority may be pre-configured to the user terminal by OAM or core network or network side device, or may be transmitted to the user terminal through a pause reporting message.

The first indication information may be the priority for the QoE measurement ID. That is, the network side device specifies, in the first indication information transmitted to the user terminal, which reporting for the QoE measurement reports corresponding to which priority (ies) for the QoE measurement ID to be paused. After receiving the pause reporting message, the user terminal can determine the QoE measurement reports corresponding to QoE measurement ID priority specified in the first indication information based on the specified QoE measurement ID priority and pause the reporting for the determined QoE measurement reports. Each QoE measurement ID priority may be pre-configured to the user terminal by OAM or core network or network side device, or may be transmitted to the user terminal through a pause reporting message.

The first indication information may be the service type. That is, the network side device specifies, in the first indication information transmitted to the user terminal, which reporting for the QoE measurement reports corresponding to which service type(s) to be paused. After receiving the pause reporting message, the user terminal can determine the QoE measurement reports corresponding to service type specified in the first indication information based on the specified service type and pause the reporting for the determined QoE measurement reports. There may be one or more specified service types.

The first indication information may be the QoE configuration type. That is, the network side device specifies, in the first indication information transmitted to the user terminal, which reporting for the QoE measurement reports corresponding to which QoE configuration type to be paused. After receiving the pause reporting message, the user terminal can determine the QoE measurement reports corresponding to QoE configuration type specified in the first indication information based on the specified QoE configuration type and pause the reporting for the determined QoE measurement reports. In an embodiment, the QoE configuration type specified in the first indication information may be a signaling-based QoE configuration type, or a management-based QoE configuration type.

It should be noted that QoE measurement IDs corresponding to each QoE configuration can be carried in the QoE measurement configuration message transmitted from the network side device to the user terminal, and the user terminal can determine QoE measurement reports corresponding to the QoE configuration based on the QoE measurement ID.

In an embodiment, the above-mentioned QoE measurement ID may be a QoE reference.

In the method for reporting the QoE measurement reports according to the embodiments of the present application, the user terminal can pause the reporting for the corresponding QoE measurement reports based on the QoE measurement ID, the priority for the service type, the priority for the QoE measurement ID, the service type, or the QoE configuration type specified by the network side device, which improves the flexibility of the network side device to control the user terminal to report the QoE measurement reports.

In an embodiment, the first indication information is a first indication ID used for indicating pausing reporting for all QoE measurement reports:

the pausing the reporting for the QoE measurement reports corresponding to the first indication information, includes:

pausing the reporting for all QoE measurement reports based on received first indication ID.

The first indication information may also be a first indication ID indicating pausing the reporting for all QoE measurement reports, that is, the network side device indicates the user terminal to pause the reporting for all QoE measurement reports in the first indication information transmitted to the user terminal. After receiving the pause reporting message, the user terminal may pause the reporting for all ongoing QoE measurement reports based on the first indication ID.

It can be understood that the transmission of the above-mentioned first indication ID only occupies few system resources, to avoid increasing burdens of the network side device as much as possible. In an embodiment, the first indication ID may be 1-bit indication information.

In the method for reporting the QoE measurement reports provided by the embodiments of the present application, the user terminal can pause the reporting for all ongoing QoE measurement reports based on the first indication ID transmitted from the network side device, and the network side device can control the reporting for the QoE measurement reports from the user terminal by only occupying few system resources, to further alleviate burdens of the network side device.

In an embodiment, before the receiving a pause reporting message for the QoE measurement reports transmitted from a network side device, the method further includes:

receiving a signaling message transmitted from the network side device, where the signaling message includes the first indication information.

The first indication information in the above-mentioned embodiment may be included in the pause reporting message transmitted from the network side device. When the pause reporting message is received, the user terminal can directly determine reporting for the QoE measurement reports to be paused based on the first indication information in the pause reporting message.

The first indication information in the foregoing embodiment may further be included in a signaling message prior to the pause reporting message. In an embodiment, the signaling message may be various RRC signaling or broadcast messages, which are not specifically limited herein, for example, it may be an RRC reconfiguration message, or a QoE measurement configuration message.

It can be understood that if the first indication information is included in the signaling message prior to the pause reporting message, the pause reporting message may not include the first indication information, and may include an indication ID indicating that the user terminal pauses reporting for the QoE measurement reports. The indication ID is used for notifying the user terminal that it is necessary to pause the reporting for the QoE measurement reports. After receiving the indication ID, the user terminal can determine which QoE measurement report or which QoE measurement reports to be paused based on the first indication ID received prior to the pause reporting message.

Since the transmission of the indication ID only occupies few system resources, it can avoid further increasing burdens of the network side device when the load of the network side device is heavy, and QoE measurement reports to be paused reported subsequently by the user terminal are indicated by the first indication information prior to the pause reporting message, which improves the flexibility of the network side device to control the reporting for the QoE measurement reports. In an embodiment, the indication ID may be 1-bit indication information.

In an embodiment, the method further includes:

transmitting a response message to the network side device, where the response message is used for notifying the network side device that it has determined to pause the reporting for the QoE measurement reports corresponding to the first indication information.

After pausing the reporting for the QoE measurement report corresponding to the first indication information, the user terminal may transmit a response message to the network side device to notify the network side device that the user terminal has determined to pause reporting for the QoE measurement reports corresponding to the first indication information.

In an embodiment, the method further includes:

receiving a configuration message transmitted from the network side device, where the configuration message includes association information between a service type and a QoE measurement ID;

the pausing the reporting for the QoE measurement reports corresponding to the first indication information based on the pause reporting message, includes:

in case that the first indication information is a service type, determining QoE measurement reports corresponding to the service type and QoE measurement reports corresponding to QoE measurement ID associated with the service type based on the received association information between the service type and the QoE measurement ID; and pausing reporting for determined QoE measurement reports to the network side device.

The user terminal may also receive a configuration message transmitted from the network side device, where the configuration message includes association information between the service type and the QoE measurement ID. The user terminal may not only pause the reporting for the QoE measurement reports corresponding to the first indication information, but also pause the reporting for the QoE measurement reports corresponding to the QoE measurement ID associated with the service type based on the association information between the service type and the QoE measurement ID, or pause the reporting for the QoE measurement reports corresponding to the service type associated with the QoE measurement ID, which improves the flexibility of the network side device to control the reporting for the QoE measurement reports by the user terminal.

For example, in case that the first indication information is the priority for the service type, the user terminal can not only pause the reporting for the QoE measurement reports corresponding to the priority for a specified service type, but also determine service types corresponding to the priorities for the specified service types, determine the QoE measurement IDs associated with these service types based on the association information between the service types and the QoE measurement IDs, and pause the reporting for the QoE measurement reports corresponding to these QoE measurement IDs.

For example, in case that the first indication information is the priority for the QoE measurement ID, the user terminal can not only pause the reporting for the QoE measurement reports corresponding to the priority for a specified QoE measurement ID, but also determine QoE measurement IDs corresponding to the priorities for the specified QoE measurement ID, determine the service types associated with these QoE measurement IDs based on the association information between the service types and the QoE measurement IDs, and pause the reporting for the QoE measurement reports corresponding to these service types.

For example, in case that the first indication information is the service type, the user terminal can not only pause the reporting for the QoE measurement reports corresponding to a specified service type, but also determine QoE measurement IDs associated with service types based on the association information between the service types and the QoE measurement IDs, and pause the reporting for the QoE measurement reports corresponding to these QoE measurement IDs.

For example, in case that the first indication information is the QoE measurement ID, the user terminal can not only pause the reporting for the QoE measurement reports corresponding to a specified QoE measurement ID, but also determine service types associated with QoE measurement IDs based on the association information between the service types and the QoE measurement IDs, and pause the reporting for the QoE measurement reports corresponding to these service types.

The pausing the reporting for the QoE measurement reports in the embodiment of the present application includes, but not limited to, the following cases.

Case 1: the network side device notifies the user terminal in advance of the QoE content of the reporting to be paused through the QoE measurement configuration message, for example, the first indication information in the foregoing embodiment. After receiving the QoE measurement configuration message, the user terminal performs QoE measurement, stores the QoE measurement report obtained from the measurement, and reports the QoE measurement report. When the network side device determines through detection that the user terminal needs to pause reporting for the QoE measurement reports, it transmits a pause reporting message to the user terminal. The pause reporting message includes a pause indication. After receiving the pause reporting message, the user terminal determines that the reporting for the QoE measurement reports needs to be paused based on the pause indication. However, whether to pause completely or partially may be determined based on the QoE content to be paused carried in the QoE measurement configuration message. After the determination, the user terminal performs pausing the reporting.

Case 2: it is different from case 1 in that: 1. the network side device notifies the user terminal in advance of the form of the pause reporting message through the QoE measurement configuration message: 2. when the network side device determines through detection that the user terminal needs to pause the reporting for the QoE measurement reports, it transmits the pausing reporting message to the user terminal. After receiving the pause reporting message, the user terminal determines to pause the reporting for the QoE measurement reports. However, whether to pause completely or partially may be determined based on the QoE content to be paused carried in the pause reporting message. After the determination, the user terminal performs pausing the reporting.

Case 3: it is different from case 1 in that: 1. the network side device first transmits a QoE measurement configuration message to the user terminal, and the QoE measurement configuration message has not included the content related to pausing the reporting: 2. when the network side device determines through detection that the user terminal needs to pause the reporting for the QoE measurement reports, it transmits the pausing reporting message to the user terminal. The pause reporting message includes the reporting for the QoE content to be paused or indication information for indicating completely pausing the reporting. After receiving the pause reporting message, the user terminal may determine the reporting for the QoE content to be paused according to the content carried in the pause reporting message. After the determination, the user terminal performs pausing the reporting.

In an embodiment, the method further includes:

receiving a resume reporting message transmitted from the network side device, where the resume reporting message is used to indicate the user terminal to resume the reporting for the QoE measurement reports.

The method mentioned above will be described below through specific embodiments.

Embodiment 1: Configuring a Priority for a Service Type

Step 1: OAM or CN transmits QoE configuration to the network side device, and the network side device forwards the QoE configuration to the UE and configures the service type.

Step 2: after receiving the QoE configuration, the UE starts to perform QoE measurements, and reports QoE measurement reports.

Step 3: when the load of the network side device is heavy or the UE is connected to a network side device that does not support QoE services, it is determined to pause or resume the reporting for the QoE measurement reports from the UE. An RRCReconfiguration message includes information about specifying reporting for QoE measurement reports corresponding to which priorities for the service type that need to be paused or resumed.

Step 4: the UE receives the RRCReconfiguration message, reads the reporting for QoE measurement reports corresponding to which priorities for the service types that need to be paused or resumed, then pauses or resumes the reporting for the QoE measurement reports corresponding to the priority for the service type. Priorities for each service type can be pre-configured for the UE by the OAM or the CN or network side device, and can also be transmitted to the UE through the above RRCReconfiguration message.

Step 5: after pausing or resuming the reporting for the QoE measurement reports corresponding to the priorities for the service types, the UE includes an indication that the reporting has been paused or resumed in the RRCReconfigurationComplete message, and notifies the network side device that the UE has paused or resumed the reporting for the QoE measurement reports corresponding to the priority for the service type.

Embodiment 2: Configuring a Priority for QoE Reference

Step 1: the OAM or the CN transmits QoE configuration to the network side device, and the network side device forwards the QoE configuration to the UE and configures the service type and QoE reference.

Step 2: after receiving the QoE configuration, the UE starts to perform QoE measurements, and reports QoE measurement reports.

Step 3: when the load of the network side device is heavy or the UE is connected to a network side device that does not support QoE services, it is determined to pause or resume the reporting for the QoE measurement reports from the UE. An RRCReconfiguration message includes information about specifying reporting for QoE measurement reports corresponding to which priorities for the QoE reference that need to be paused or resumed.

Step 4: the UE receives the RRCReconfiguration message, reads the reporting for QoE measurement reports corresponding to which priorities for the QoE reference that need to be paused or resumed, then pauses or resumes the reporting for the QoE measurement reports corresponding to the priorities for the QoE reference. Priorities for each QoE reference can be pre-configured for the UE by the OAM or the CN or network side device, and can also be transmitted to the UE through the above RRCReconfiguration message.

Step 5: after pausing or resuming the reporting for the QoE measurement reports corresponding to the priority for the QoE reference, the UE includes an indication that the reporting has been paused or resumed in the RRCReconfigurationComplete message, and notifies the network side device that the UE has paused or resumed the reporting for the QoE measurement reports corresponding to the priority for the QoE reference.

Embodiment 3: Specifying Service Type

Step 1: the OAM or the CN transmits QoE configuration to the network side device, and the network side device forwards the QoE configuration to the UE and configures the service type.

Step 2: after receiving the QoE configuration, the UE starts to perform QoE measurements, and reports QoE measurement reports.

Step 3: when the load of the network side device is heavy or the UE is connected to a network side device that does not support QoE services, it is determined to pause or resume the reporting for the QoE measurement reports from the UE. An RRCReconfiguration message includes information about specified service type, which is used for indicating pausing or resuming the reporting for QoE measurement reports corresponding to the service type.

Step 4: the UE receives the RRCReconfiguration message, reads the service type corresponding to the reporting for the QoE measurement reports that need to be paused or resumed, and then pauses or resumes the reporting for the QoE measurement reports corresponding to the service type.

Step 5: after pausing or resuming the reporting for the QoE measurement reports corresponding to the service type, the UE includes an indication that the reporting has been paused or resumed in the RRCReconfigurationComplete message, and notifies the network side device that the UE has paused or resumed the reporting for the QoE measurement reports corresponding to the service type.

Embodiment 4: Specifying QoE Reference

Step 1: OAM transmits QoE configuration to the network side device, and the network side device forwards the QoE configuration to the UE and configures the service type and QoE reference.

Step 2: after receiving the QoE configuration, the UE starts to perform QoE measurements, and reports QoE measurement reports.

Step 3: when the load of the network side device is heavy or the UE is connected to a network side device that does not support QoE services, it is determined to pause or resume the reporting for the QoE measurement reports from the UE. An RRCReconfiguration message includes information about specified QoE reference, which is used for indicating pausing or resuming the reporting for QoE measurement reports corresponding to the QoE reference.

Step 4: the UE receives the RRCReconfiguration message, reads the QoE reference corresponding to the reporting for the QoE measurement reports that need to be paused or resumed, and then pauses or resumes the reporting for the QoE measurement reports corresponding to the QoE reference.

Step 5: after the UE pauses or resumes the reporting for the QoE measurement reports corresponding to the QoE reference, the RRCReconfigurationComplete message may include an indication that the reporting has been paused or resumed, and the UE notifies the network side device that the UE has paused or resumed the reporting for the QoE measurement reports corresponding to the QoE reference.

Embodiment 5: Adding Indication Information in an RRC Message

Step 1: the OAM or the CN transmits QoE configuration to the network side device, and the network side device forwards the QoE configuration to the UE and configures the service type.

Step 2: after receiving the QoE configuration, the UE starts to perform QoE measurements, and reports QoE measurement reports.

Step 3: when the load of the network side device is heavy or the UE is connected to a network side device that does not support QoE services, it is determined to pause or resume the reporting for the QoE measurement reports from the UE. An RRCReconfiguration message includes indication information, where the indication information indicates the UE to pause or resume the reporting for all QoE measurement reports.

Step 4: after receiving the RRCReconfiguration message, the UE reads the indication information, and pauses or resumes the reporting for all QoE measurement reports.

Step 5: after the UE pauses or resumes the reporting for all the QoE measurement reports, an indication that the reporting has been paused or resumed is included in the RRCReconfigurationComplete message, and the UE notifies the network side device that the UE has paused or resumed the reporting for all the QoE measurement reports.

Embodiment 6: Adding a QoE Configuration Type in an RRC Message

Step 1: the OAM transmits QoE configuration to the network side device, and the network side device forwards the QoE configuration to the UE and configures the service type and a QoE configuration type.

Step 2: after receiving the QoE configuration, the UE starts to perform QoE measurements, and reports QoE measurement reports.

Step 3: when the load of the network side device is heavy or the UE is connected to a network side device that does not support QoE services, it is determined to pause or resume the reporting for the QoE measurement reports from the UE. An RRCReconfiguration message includes indication information, where the indication information indicates the UE to pause or resume the reporting for QoE measurement reports corresponding to a management-based QoE configuration type (or a signaling-based QoE configuration type).

Step 4: after receiving the RRCReconfiguration massage, the UE reads the indication information, and pauses or resumes the reporting for QoE measurement reports corresponding to the management-based QoE configuration type (or the signaling-based QoE configuration type).

Step 5: after the UE pauses or resumes the reporting for the QoE measurement reports corresponding to the management-based QoE configuration type (or the signaling-based QoE configuration type), the RRCReconfigurationComplete message may include an indication that the reporting has been paused or resumed, and the UE notifies the network side device that it has paused or resumed the reporting for the QoE measurement reports corresponding to the management-based QoE configuration type (or the signaling-based QoE configuration type).

Embodiment 7: Specifying a Priority for a Service Type in QoE Measurement Configuration Message Step 1: the OAM or the CN transmits QoE configuration to the network side device, and the network side device forwards the QoE configuration to the UE and configures the service type. Indication information is included in the QoE measurement configuration message, where the indication information indicates the UE to pause or resume the reporting for the QoE measurement reports corresponding to which priorities for the service type when the UE subsequently receives indication from the network side device to pause or resume the reporting for the QoE measurement reports.

Step 2: after receiving the QoE configuration, the UE starts to perform QoE measurements, and reports QoE measurement reports.

Step 3: when the load of the network side device is heavy or the UE is connected to a network side device that does not support QoE services, it is determined to pause or resume the reporting for the QoE measurement reports from the UE. Indication information is included in an RRCReconfiguration message, where the indication information indicates the UE to pause or resume the reporting for the QoE measurement reports.

Step 4: after receiving the RRCReconfiguration message, the UE reads the indication information, and then determines the reporting for the QoE measurement reports that need to be paused or resumed corresponding to which priorities for the service type based on the indication information in the QoE measurement configuration message received in step 1, and then pauses or resumes the reporting for the QoE measurement reports corresponding to the priority for the service type. Priorities for each the service type can be pre-configured to the UE by the OAM or the CN or network side device, or through the above-mentioned QoE measurement configuration message or RRCReconfiguration message transmitted to the UE.

Step 5: after the UE pauses or resumes the reporting for the QoE measurement reports corresponding to the priority for the service type, an indication that the reporting has been paused or resumed is included in the RRCReconfigurationComplete message, and the UE notifies the network side device that it has paused or resumed the reporting for the QoE measurement reports corresponding to the priority for the service type.

Embodiment 8: Adding Indication Information in a QoE Measurement Configuration Message Step 1: the OAM or the CN transmits QoE configuration to the network side device, and the network side device forwards the QoE configuration to the UE and configures the service type. Indication information is included in the QoE measurement configuration message, where the indication information indicates the UE that the reporting for the QoE measurement reports that need to be paused or resumed is all the QoE measurement reports when the UE subsequently receives indication from the network side device to pause or resume the reporting for the QoE measurement reports.

Step 2: after receiving the QoE configuration, the UE starts to perform QoE measurements, and reports QoE measurement reports.

Step 3: when the load of the network side device is heavy or the UE is connected to a network side device that does not support QoE services, it is determined to pause or resume the reporting for the QoE measurement reports from the UE. Indication information is included in an RRCReconfiguration message, where the indication information indicates the UE to pause or resume the reporting for the QoE measurement reports.

Step 4: after receiving the RRCReconfiguration message, the UE reads the indication information, and determines that reporting for the QoE measurement reports that need to be paused or resumed are all the QoE measurement reports based on the indication information in the QoE measurement configuration message received in step 1 and then pauses or resumes the reporting for all the QoE measurement reports.

Step 5: after the UE pauses or resumes the reporting for all the QoE measurement reports, an indication that the reporting has been paused or resumed is included in the RRCReconfigurationComplete message, and the UE notifies the network side device that it has paused or resumed the reporting for all the QoE measurement reports.

FIG. 2 is a schematic flowchart of a method for reporting quality of experience (QoE) measurement reports according to an embodiment of the present application. The method is applied to a network side device. As shown in FIG. 2, the method includes the following steps.

Step 200: starting.

Step 201: transmitting a pause reporting message for the QoE measurement reports to a user terminal to indicate the user terminal to pause reporting for the QoE measurement reports based on first indication information transmitted from the network side device.

In order to collect experience parameters of different service types, the CN or the OAM will first transmit the QoE configuration to the network side device. After receiving the QoE configuration, the network side device may transmit a QoE measurement configuration message to the user terminal. The QoE measurement configuration message carries information such as the QoE configuration and a service type. After receiving the QoE measurement configuration message, the user terminal may start to perform QoE measurement based on configuration information in the QoE measurement configuration message, records QoE measurement reports and reports them.

When the network side device determines that the user terminal needs to pause reporting for the QoE measurement reports, for example, when burdens of the network side device is heavy, or the user terminal is handed over or reconnected to a network side device that does not support the QoE services, in order to alleviate burdens of the network side device, or to prevent invalid reporting from occupying system resources, the network side device may transmit a pause reporting message for the QoE measurement reports to the user terminal to indicate the user terminal to pause the reporting for part or all of the QoE measurement reports. The user terminal may determine which QoE measurement report(s) to be paused from reporting based on the first indication information transmitted from the network side device.

In an embodiment, the pause reporting message for the above-mentioned QoE measurement reports may be various radio resource control (RRC) signaling or broadcast messages, which are not specifically limited here, for example, it may be RRC reconfiguration message.

In the method for reporting the QoE measurement reports provided by the embodiments of the present application, the network side device may transmit a pause reporting message to the user terminal, indicate the user terminal to pause the reporting for part or all of the QoE measurement report, and burdens may be alleviated by controlling the reporting for the QoE measurement reports performed by the user terminal.

In an embodiment, the first indication information is one or more of a QoE measurement ID, a priority for a service type, a priority for a QoE measurement ID, a service type, a QoE configuration type and a first indication ID used for indicating pausing reporting for all QoE measurement reports.

In an embodiment, the first indication information may be one or more of a priority for a service type, a priority for a QoE measurement ID, a service type, a QoE measurement ID, a QoE configuration type and a first indication ID used for indicating pausing the reporting for all the QoE measurement reports. After receiving the pause reporting message, the user terminal may pause the reporting for the QoE measurement reports corresponding to the first indication information based on the first indication information transmitted from the network side device.

The first indication information may be the QoE measurement ID. That is, the network side device specifies, in the first indication information transmitted to the user terminal, which reporting for the QoE measurement reports corresponding to which QoE measurement ID(s) to be paused. After receiving the pause reporting message, the user terminal can determine the QoE measurement reports corresponding to QoE measurement ID specified in the first indication information based on the specified QoE measurement ID and pause the reporting for the determined QoE measurement reports. There may be one or more specified QoE measurement IDs.

The first indication information may be the priority for the service type. That is, the network side device specifies, in the first indication information transmitted to the user terminal, which reporting for the QoE measurement reports corresponding to which priority (ies) for the service type to be paused. After receiving the pause reporting message, the user terminal can determine the QoE measurement reports corresponding to service type priority specified in the first indication information based on the specified service type priority and pause the reporting for the determined QoE measurement reports. Each service type priority may be pre-configured to the user terminal by OAM or core network or network side device, or may be transmitted to the user terminal through a pause reporting message.

The first indication information may be the priority for the QoE measurement ID. That is, the network side device specifies, in the first indication information transmitted to the user terminal, which reporting for the QoE measurement reports corresponding to which priority (ies) for the QoE measurement ID to be paused. After receiving the pause reporting message, the user terminal can determine the QoE measurement reports corresponding to QoE measurement ID priority specified in the first indication information based on the specified QoE measurement ID priority and pause the reporting for the determined QoE measurement reports. Each QoE measurement ID priority may be pre-configured to the user terminal by OAM or core network or network side device, or may be transmitted to the user terminal through a pause reporting message.

The first indication information may be the service type. That is, the network side device specifies, in the first indication information transmitted to the user terminal, which reporting for the QoE measurement reports corresponding to which service type(s) to be paused. After receiving the pause reporting message, the user terminal can determine the QoE measurement reports corresponding to service type specified in the first indication information based on the specified service type and pause the reporting for the determined QoE measurement reports. There may be one or more specified service types.

The first indication information may be the QoE configuration type. That is, the network side device specifies, in the first indication information transmitted to the user terminal, which reporting for the QoE measurement reports corresponding to which QoE configuration type to be paused. After receiving the pause reporting message, the user terminal can determine the QoE measurement reports corresponding to QoE configuration type specified in the first indication information based on the specified QoE configuration type and pause the reporting for the determined QoE measurement reports. In an embodiment, the QoE configuration type specified in the first indication information may be a signaling-based QoE configuration type, or a management-based QoE configuration type.

The first indication information may also be a first indication ID indicating pausing the reporting for all QoE measurement reports, that is, the network side device indicates the user terminal to pause the reporting for all QoE measurement reports in the first indication information transmitted to the user terminal. After receiving the pause reporting message, the user terminal may pause the reporting for all ongoing QoE measurement reports based on the first indication ID. It can be understood that the transmission of the above-mentioned first indication ID only occupies few system resources to avoid increasing the burden on the network side device as much as possible. In an embodiment, the first indication ID may be 1-bit indication information.

It should be noted that QoE measurement IDs corresponding to each QoE configuration can be carried in the QoE measurement configuration message transmitted from the network side device to the user terminal, and the user terminal can determine QoE measurement reports corresponding to the QoE configuration based on the QoE measurement ID.

In an embodiment, the above-mentioned QoE measurement ID may be a QoE reference.

In the method for reporting the QoE measurement reports according to the embodiments of the present application, the first indication information transmitted from the network side device to the user terminal may be one or more of the QoE measurement ID, the priority for the service type, the priority for the QoE measurement ID, the service type, the QoE configuration type or the first indication ID used for indicating pausing the reporting for all the QoE measurement reports, which improves the flexibility of the network side device to control the reporting for the QoE measurement reports performed by the user terminal.

In an embodiment, before the transmitting a pause reporting message for the QoE measurement reports to the user terminal, the method further includes:

transmitting a signaling message to the user terminal, where the signaling message includes the first indication information.

The first indication information in the above-mentioned embodiment may be included in the pause reporting message transmitted from the network side device. When the pause reporting message is received, the user terminal can directly determine reporting for the QoE measurement reports to be paused based on the first indication information in the pause reporting message.

The first indication information in the foregoing embodiment may further be included in a signaling message prior to the pause reporting message. In an embodiment, the signaling message may be various RRC signaling or broadcast messages, which are not specifically limited herein, for example, it may be an RRC reconfiguration message, or a QoE measurement configuration message.

It can be understood that if the first indication information is included in the signaling message prior to the pause reporting message, the pause reporting message may not include the first indication information, and may include an indication ID indicating that the user terminal pauses reporting for the QoE measurement reports. The indication ID is used for notifying the user terminal that it is necessary to pause the reporting for the QoE measurement reports. After receiving the indication ID, the user terminal can determine which QoE measurement report or which QoE measurement reports to be paused based on the first indication ID received prior to the pause reporting message.

Since the transmission of the indication ID only occupies few system resources, it can avoid further increasing burdens of the network side device when the load of the network side device is heavy, and QoE measurement reports to be paused reported subsequently by the user terminal are indicated by the first indication information prior to the pause reporting message, which improves the flexibility of the network side device to control the reporting for the QoE measurement reports. In an embodiment, the indication ID may be 1-bit indication information.

In an embodiment, the method further includes:

receiving a response message transmitted from the user terminal, where the response message is used for notifying the network side device that the user terminal has determined to pause the reporting for the QoE measurement reports corresponding to the first indication information.

After pausing the reporting for the QoE measurement report corresponding to the first indication information, the user terminal may transmit a response message to the network side device to notify the network side device that the user terminal has determined to pause reporting for the QoE measurement reports corresponding to the first indication information.

In an embodiment, the method further includes:

transmitting a configuration message to the user terminal, where the configuration message includes association information between a service type and a QoE measurement ID.

For example, the network side device may also transmit a configuration message to the user terminal, where the configuration message includes association information between the service type and the QoE measurement ID. The user terminal may not only pause the reporting for the QoE measurement reports corresponding to the first indication information, but also pause the reporting for the QoE measurement reports corresponding to the QoE measurement ID associated with the service type based on the association information between the service type and the QoE measurement ID, or pause the reporting for the QoE measurement reports corresponding to the service type associated with the QoE measurement ID, which improves the flexibility of the network side device to control the reporting for the QoE measurement reports performed by the user terminal.

For example, in case that the first indication information is the priority for the service type, the user terminal can not only pause the reporting for the QoE measurement reports corresponding to the priority for a specified service type, but also determine service types corresponding to the priorities for the specified service types, determine the QoE measurement IDs associated with these service types based on the association information between the service types and the QoE measurement IDs, and pause the reporting for the QoE measurement reports corresponding to these QoE measurement IDs.

For example, in case that the first indication information is the priority for the QoE measurement ID, the user terminal can not only pause the reporting for the QoE measurement reports corresponding to the priority for a specified QoE measurement ID, but also determine QoE measurement IDs corresponding to the priorities for the specified QoE measurement ID, determine the service types associated with these QoE measurement IDs based on the association information between the service types and the QoE measurement IDs, and pause the reporting for the QoE measurement reports corresponding to these service types.

For example, in case that the first indication information is the service type, the user terminal can not only pause the reporting for the QoE measurement reports corresponding to a specified service type, but also determine QoE measurement IDs associated with service types based on the association information between the service types and the QoE measurement IDs, and pause the reporting for the QoE measurement reports corresponding to these QoE measurement IDs.

For example, in case that the first indication information is the QoE measurement ID, the user terminal can not only pause the reporting for the QoE measurement reports corresponding to a specified QoE measurement ID, but also determine service types associated with QoE measurement IDs based on the association information between the service types and the QoE measurement IDs, and pause the reporting for the QoE measurement reports corresponding to these service types.

The methods and the apparatuses are based on the same disclosed concept, the implementation of the apparatuses and the methods can be referred to each other since the principles of the methods and the devices are similar, and the repetition will not be repeated.

FIG. 3 is a schematic structural diagram of a user terminal according to an embodiment of the present application. As shown in FIG. 3, the user terminal includes a memory 320, a transceiver 310, and a processor 300, where the processor 300 and the memory 320 may also be arranged physically separately.

The memory 320 is used to store computer programs: and the transceiver 310 is used to transmit and receive data under the control of the processor 300.

The transceiver 310 is used to receive and transmit data under the control of the processor 300.

In FIG. 3, a bus architecture may include any number of interconnected buses and bridges, which are linked together through various circuits of one or more processors represented by processor 300 and one or more memories represented by the memory 320. The bus architecture may also link together various other circuits, such as peripherals, voltage regulators, and power management circuits, which are well known in the art, and therefore will not be further described in the present application. The bus interface provides an interface. Transceiver 310 may be multiple elements, i.e., including a transmitter and a receiver, units for providing communication with various other devices over transmission media including wireless channels, wired channels, fiber optic cables, and the like. For different user equipment, the user interface 330 may also be an interface capable of externally or internally connecting the required equipment, and the connected equipment includes, but not limited to, a keypad, a display, a speaker, a microphone, a joystick, and the like.

The processor 300 is responsible for managing the bus architecture and general processing, and the memory 320 may store data used by the processor 300 when performing operations.

The processor 300 may be a central processing unit (CPU), an application specific integrated circuit (ASIC), a field-programmable gate array (FPGA), or a complex programmable logic device (CPLD), the processor can also use a multi-core architecture.

The processor 300 is configured to perform any one of the methods of the embodiments of the present application when executing the executable instructions by calling the computer program stored in the memory 320. The method includes: receiving a pause reporting message for the QoE measurement reports transmitted from a network side device, where the pause reporting message is used to indicate the user terminal to pause reporting for the QoE measurement reports based on first indication information transmitted from the network side device; and pausing reporting for the QoE measurement reports corresponding to the first indication information based on the pause reporting message.

In an embodiment, the first indication information is one or more of a QoE measurement ID, a priority for a service type, a priority for a QoE measurement ID, a service type and a QoE configuration type. The pausing reporting for the QoE measurement reports corresponding to the first indication information, includes: determining the QoE measurement reports corresponding to the first indication information based on received first indication information: and pausing reporting for the determined QoE measurement reports.

In an embodiment, the first indication information is a first indication ID used for indicating pausing reporting for all QoE measurement reports: The pausing the reporting for the QoE measurement reports corresponding to the first indication information, includes: pausing the reporting for all QoE measurement reports based on received first indication ID.

In an embodiment, before the receiving a pause reporting message for the QoE measurement reports transmitted from a network side device, the method further includes: receiving a signaling message transmitted from the network side device, where the signaling message includes the first indication information.

In an embodiment, the method further includes: transmitting a response message to the network side device, where the response message is used for notifying the network side device that it has determined to pause the reporting for the QoE measurement reports corresponding to the first indication information.

In an embodiment, the method further includes: receiving a configuration message transmitted from the network side device, where the configuration message includes association information between a service type and a QoE measurement ID: The pausing the reporting for the QoE measurement reports corresponding to the first indication information based on the pause reporting message, includes: in case that the first indication information is a service type, determining QoE measurement reports corresponding to the service type and QoE measurement reports corresponding to QoE measurement ID associated with the service type based on the received association information between the service type and the QoE measurement ID: and pausing reporting for determined QoE measurement reports to the network side device.

FIG. 4 is a schematic structural diagram of a network side device according to an embodiment of the present application. As shown in FIG. 4, the network side device includes a memory 420, a transceiver 410, and a processor 400, where the processor 400 and the memory 420 may also be arranged physically separately.

The memory 420 is used to store computer programs: and the transceiver 410 is used to transmit and receive data under the control of the processor 400.

The transceiver 410 is used to receive and transmit data under the control of the processor 400.

In FIG. 4, a bus architecture may include any number of interconnected buses and bridges, which are linked together through various circuits of one or more processors represented by processor 400 and one or more memories represented by the memory 420. The bus architecture may also link together various other circuits, such as peripherals, voltage regulators, and power management circuits, which are well known in the art, and therefore will not be further described in the present application. The bus interface provides an interface. Transceiver 410 may be multiple elements, i.e., including a transmitter and a receiver, units for providing communication with various other devices over transmission media including wireless channels, wired channels, fiber optic cables, and the like. The processor 400 is responsible for managing the bus architecture and general processing, and the memory 420 may store data used by the processor 400 when performing operations.

The processor 400 may be a CPU, ASIC, FPGA or CPLD, and the processor may also use a multi-core architecture.

The processor 401 is configured to perform any one of the methods of the embodiments of the present application when executing the executable instructions by calling the computer program stored in the memory 402. The method includes: transmitting a pause reporting message for the QoE measurement reports to a user terminal to indicate the user terminal to pause reporting for the QoE measurement reports based on first indication information transmitted from the network side device.

In an embodiment, the first indication information is one or more of a QoE measurement ID, a priority for a service type, a priority for a QoE measurement ID, a service type, a QoE configuration type and a first indication ID used for indicating pausing reporting for all QoE measurement reports.

In an embodiment, before the transmitting a pause reporting message for the QoE measurement reports to the user terminal, the method further includes: transmitting a signaling message to the user terminal, where the signaling message includes the first indication information.

In an embodiment, the method further includes: receiving a response message transmitted from the user terminal, where the response message is used for notifying the network side device that the user terminal has determined to pause the reporting for the QoE measurement reports corresponding to the first indication information.

In an embodiment, the method further includes: transmitting a configuration message to the user terminal, where the configuration message includes association information between a service type and a QoE measurement ID.

It should be noted here that the above-mentioned user terminal and the network side device according to the embodiments of the present application can implement all the method steps implemented by the above-mentioned method embodiments, and can achieve the same effect. The same parts and beneficial effects as the same method embodiments will not be repeated here.

FIG. 5 is a schematic structural diagram of an apparatus for reporting quality of experience (QoE) measurement reports according to an embodiment of the present application. The apparatus is applied to a user terminal. As shown in FIG. 5, the user terminal includes:

- a first receiving device 500, used for receiving a pause reporting message for the QoE measurement reports transmitted from a network side device, where the pause reporting message is used to indicate the user terminal to pause reporting for the QoE measurement reports based on first indication information transmitted from the network side device: and a reporting device 510, used for pausing reporting for the QoE measurement reports corresponding to the first indication information based on the pause reporting message.

In an embodiment, the first indication information is one or more of a QoE measurement ID, a priority for a service type, a priority for a QoE measurement ID, a service type and a QoE configuration type. The pausing the reporting for the QoE measurement reports corresponding to the first indication information, includes: determining QoE measurement reports corresponding to the first indication information based on received first indication information: and pausing the reporting for determined QoE measurement reports.

In an embodiment, the first indication information is a first indication ID used for indicating pausing reporting for all QoE measurement reports: The pausing the reporting for the QoE measurement reports corresponding to the first indication information, includes: pausing the reporting for all QoE measurement reports based on received first indication ID.

In an embodiment, the first receiving device 500 is further used for: receiving a signaling message transmitted from the network side device, where the signaling message includes the first indication information.

In an embodiment, the apparatus further includes:

a first transmitting device 520, used for transmitting a response message to the network side device, where the response message is used for notifying the network side device that it has determined to pause the reporting for the QoE measurement reports corresponding to the first indication information.

In an embodiment, the first receiving device 500 is further used for: receiving a configuration message transmitted from the network side device, where the configuration message includes association information between a service type and a QoE measurement ID: The pausing the reporting for the QoE measurement reports corresponding to the first indication information based on the pause reporting message, includes: in case that the first indication information is a service type, determining QoE measurement reports corresponding to the service type and QoE measurement reports corresponding to QoE measurement ID associated with the service type based on the received association information between the service type and the QoE measurement ID: and pausing reporting for determined QoE measurement reports to the network side device.

FIG. 6 is a schematic structural diagram of an apparatus for reporting quality of experience (QoE) measurement reports according to an embodiment of the present application. The apparatus is applied to a network side device. As shown in FIG. 6, the network side device includes:

a second transmitting device 600, used for transmitting a pause reporting message for the QoE measurement reports to a user terminal to indicate the user terminal to pause reporting for the QoE measurement reports based on first indication information transmitted from the network side device.

In an embodiment, the first indication information is one or more of a QoE measurement ID, a priority for a service type, a priority for a QoE measurement ID, a service type, a QoE configuration type and a first indication ID used for indicating pausing reporting for all QoE measurement reports.

In an embodiment, the second transmitting device 600 is further used for:

transmitting a signaling message to the user terminal, where the signaling message includes the first indication information.

In an embodiment, the apparatus further includes:

a second receiving device 610, used for receiving a response message transmitted from the user terminal, where the response message is used for notifying the network side device that the user terminal has determined to pause the reporting for the QoE measurement reports corresponding to the first indication information.

In an embodiment, the second transmitting device 600 is further used for:

transmitting a configuration message to the user terminal, where the configuration message includes association information between a service type and a QoE measurement ID.

It should be noted that, the division of units in the embodiments of the present application is schematic, and is only a logical function division, and there may be other division manners in actual implementation. In addition, the functional units in the various embodiments of the present application may be integrated into one processing unit, or each unit may exist alone physically, or two or more units may be integrated into one unit. The above-mentioned integrated unit may be implemented in the form of hardware or software functional unit.

If the integrated unit is implemented in the form of a software functional unit and sold or used as an independent product, it may be stored in a computer readable storage medium. Based on such understanding, the embodiments of the present application in essence or a part of the embodiments that contributes to the prior art, or all or part of the embodiments, may be embodied in the form of a software product, which is stored in a storage medium, including several instructions to cause a computer device (which may be a personal computer, server, or network device, etc.) or a processor to perform all or part of the steps of the methods described in the respective embodiments of the present application. The storage medium described above includes various media that can store program codes such as U disk, mobile hard disk, read-only memory (ROM), random access memory (RAM), magnetic disk, or optical disk.

It should be noted here that the above-mentioned apparatus according to the embodiments of the present application can implement all the method steps implemented by the above-mentioned method embodiments, and can achieve the same effect. The same parts and beneficial effects as the same method embodiments will not be repeated here.

An embodiment of the present application further provides a processor-readable storage medium having stored thereon, a computer program that cause a processor to perform the steps of the steps of the method for reporting QoE measurement reports, including: receiving a pause reporting message for the QoE measurement reports transmitted from a network side device, where the pause reporting message is used to indicate the user terminal to pause reporting for the QoE measurement reports based on first indication information transmitted from the network side device: and pausing reporting for the QoE measurement reports corresponding to the first indication information based on the pause reporting message.

An embodiment of the present application further provides a processor-readable storage medium having stored thereon, a computer program that cause a processor to perform the steps of the steps of the method for reporting QoE measurement reports, including: transmitting a pause reporting message for the QoE measurement reports to a user terminal to indicate the user terminal to pause reporting for the QoE measurement reports based on first indication information transmitted from the network side device.

The processor-readable storage medium can be any available medium or data storage device that can be accessed by the processor, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof can be implemented by computer-executable instructions. These computer-executable instructions may be provided to processors of a general purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These processor-executable instructions may also be stored in a processor-readable memory capable of directing a computer or other programmable data processing apparatus to operate in a particular manner, and the instructions stored in the processor-readable memory may result in a manufacture including instruction means, the instruction means can perform the functions specified in one or more flows of the flowchart and/or one or more blocks of the block diagram.

These processor-executable instructions can also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

The user terminal in the embodiments of the present application may be a device that provides voice and/or data connectivity to a user, a handhold device with a wireless connection function, or other processing device connected to a wireless modem. In different systems, the names of the user terminal may be different. For example, in the 5G system, the user terminal may be called as user equipment (UE). A radio terminal can communicate with one or more core networks (CN) via a radio access network (RAN), and the radio terminal can be a mobile terminal, such as a mobile phone (or "cellular" phone) and computers with mobile terminal, e.g., a portable mobile device, a pocket-sized mobile device, a hand-held mobile device, a computer-built mobile device or a vehicle-mounted mobile device, which exchange language and/or data with the radio access network. For example, a personal communication service (PCS) phone, a radio phone, a session initiated protocol (SIP) phone, a wireless local loop (WLL) station, a personal digital assistant (PDA) and other devices. A radio terminal may also be called a system, a subscriber unit, a subscriber station, a mobile station, a mobile, a remote station, an access point, a remote terminal, an access terminal, a user terminal, a user agent, and a user device, which are not limited in the embodiments of the present application.

The network side device involved in the embodiments of the present application may be a base station, and the base station may include cells providing services for the terminal. Depending on the specific application, the network side device may also be called an access point, or may be a device in the access network that communicates with wireless terminal through one or more sectors on the air interface, or other names. The network side device can be used to exchange received air frames with Internet Protocol (IP) packets, and act as a router between radio terminal and the rest of the access network, and the rest of the access network can include an Internet protocol (IP) communication network. The network side device may also coordinate attribute management for the air interface. For example, the network side device in the embodiments of the present application may be a base transceiver station (BTS) in a global system for mobile communications (GSM) or a code division multiple access (CDMA), may also be a node B in a wide-band code division multiple access (WCDMA), may also be an evolutional node B (eNB or e-Node B) in a long term evolution (LTE) system, a 5G base station (gNB) in 5G network architecture (next generation system), may also be a Home evolved Node B (HeNB), a relay node (relay node), a femto, a pico base station (pico), etc., which are not limited in the embodiments of the present application. In some network structures, a network side device may include a centralized unit (CU) node and a distributed unit (DU) node, and the centralized unit and the distributed unit may also be geographically separated.

What is claimed is:

1. A method for reporting quality of experience (QoE) measurement reports, applied to a user terminal, comprising:

receiving a pause reporting message for the QoE measurement reports transmitted from a network side device, wherein the pause reporting message is used to indicate the user terminal to pause reporting for the QoE measurement reports based on first indication information transmitted from the network side device; and pausing reporting for the QoE measurement reports corresponding to the first indication information based on the pause reporting message;

the method further comprising:

receiving a configuration message transmitted from the network side device, wherein the configuration message comprises association information between a service type and a QoE measurement ID;

the pausing the reporting for the QoE measurement reports corresponding to the first indication information based on the pause reporting message, comprises:

in case that the first indication information is the service type, determining QoE measurement reports corresponding to the service type and QoE measurement reports corresponding to the QoE measurement ID associated with the service type based on the received association information between the service type and the QoE measurement ID; and pausing reporting for determined QoE measurement reports to the network side device.

2. The method of claim 1, wherein before the receiving the pause reporting message for the QoE measurement reports transmitted from the network side device, the method further comprises:

receiving a signaling message transmitted from the network side device, wherein the signaling message comprises the first indication information.

3. The method of claim 1, further comprising:

transmitting a response message to the network side device, wherein the response message is used for notifying the network side device that it has determined to pause the reporting for the QoE measurement reports corresponding to the first indication information.

4. A method for reporting quality of experience (QoE) measurement reports, applied to a network side device, comprising:

transmitting a pause reporting message for the QoE measurement reports to a user terminal to indicate the user terminal to pause reporting for the QoE measurement reports based on first indication information transmitted from the network side device;

the method further comprising:

transmitting a configuration message to the user terminal, wherein the configuration message comprises association information between a service type and a QoE measurement ID.

5. The method of claim 4, wherein before the transmitting the pause reporting message for the QoE measurement reports to the user terminal, the method further comprises:

transmitting a signaling message to the user terminal, wherein the signaling message comprises the first indication information.

6. The method of claim 4, further comprising:

receiving a response message transmitted from the user terminal, wherein the response message is used for notifying the network side device that the user terminal has determined to pause the reporting for the QoE measurement reports corresponding to the first indication information.

7. A network side device, comprising:

a memory;

a transceiver; and a processor, wherein the memory is used to store a computer program;

the transceiver is used to transmit and receive data under a control of the processor; and the processor is used to read the computer program in the memory and causes the network side device to execute the operations of claim 4.

8. The network side device of claim 7, wherein before the transmitting the pause reporting message for the QoE measurement reports to the user terminal, the computer program, when executed by the processor, causes the network side device to further execute the following operations of:

transmitting a signaling message to the user terminal, wherein the signaling message comprises the first indication information.

9. The network side device of claim 7, wherein the computer program, when executed by the processor, causes the network side device to further execute the following operations of:

receiving a response message transmitted from the user terminal, wherein the response message is used for notifying the network side device that the user terminal has determined to pause the reporting for the QoE measurement reports corresponding to the first indication information.

10. A user terminal, comprising:

a memory;

a transceiver; and a processor, wherein the memory is used to store a computer program;

the transceiver is used to transmit and receive data under a control of the processor; and the processor is used to read the computer program in the memory and causes the user terminal to execute the following operations of:

receiving a pause reporting message for quality of experience (QoE) measurement reports transmitted from a network side device, wherein the pause reporting message is used to indicate the user terminal to pause reporting for the QoE measurement reports based on first indication information transmitted from the network side device; and pausing reporting for the QoE measurement reports corresponding to the first indication information based on the pause reporting message;

the operations further comprising:

receiving a configuration message transmitted from the network side device, wherein the configuration message comprises association information between a service type and a QoE measurement ID;

the pausing the reporting for the QoE measurement reports corresponding to the first indication information based on the pause reporting message, comprises:

in case that the first indication information is the service type, determining QoE measurement reports corresponding to the service type and QoE measurement reports corresponding to the QoE measurement ID associated with the service type based on the received association information between the service type and the QoE measurement ID; and pausing reporting for determined QoE measurement reports to the network side device.

11. The user terminal of claim 10, wherein before the receiving the pause reporting message for the QoE measurement reports transmitted from the network side device, the computer program, when executed by the processor, causes the user terminal to further execute the following operations of:

receiving a signaling message transmitted from the network side device, wherein the signaling message comprises the first indication information.

12. The user terminal of claim 10, wherein the computer program, when executed by the processor, causes the user terminal to further execute the following operations of:

transmitting a response message to the network side device, wherein the response message is used for notifying the network side device that it has determined to pause the reporting for the QoE measurement reports corresponding to the first indication information.

* * * * *